(12) United States Patent
Pattee

(10) Patent No.: US 10,744,047 B2
(45) Date of Patent: Aug. 18, 2020

(54) DOOR MOUNTED LIFT ASSIST DEVICE

(71) Applicant: Brooke B. Pattee, Lake Forest, CA (US)

(72) Inventor: Brooke B. Pattee, Lake Forest, CA (US)

( * ) Notice: Subject to any disclaimer, the term of this patent is extended or adjusted under 35 U.S.C. 154(b) by 0 days.

(21) Appl. No.: 16/370,365

(22) Filed: Mar. 29, 2019

(65) Prior Publication Data
US 2019/0298591 A1    Oct. 3, 2019

Related U.S. Application Data

(60) Provisional application No. 62/761,642, filed on Apr. 2, 2018.

(51) Int. Cl.
*A61G 3/06* (2006.01)
*B60R 3/00* (2006.01)
*B60P 1/64* (2006.01)

(52) U.S. Cl.
CPC ............ *A61G 3/062* (2013.01); *B60R 3/007* (2013.01); *B60P 1/6409* (2013.01)

(58) Field of Classification Search
CPC .. A61G 7/1048; A61G 7/1017; A61G 7/1019; A61G 7/1076; A61G 7/1044; A61G 7/1059; A61G 3/062; A61G 3/02; B60R 3/007; B60R 11/00; B60P 1/44; B60P 1/4414; B60P 1/4485; B60P 1/6409; B60N 3/023; B60N 3/026; B60N 2/245; B60N 2/36; B60N 2/366; A61H 2201/0123; A61H 2201/0119
USPC .................. 212/180; 296/146.5, 146.6, 1.02
See application file for complete search history.

(56) References Cited

U.S. PATENT DOCUMENTS

| | | | | |
|---|---|---|---|---|
| 3,172,551 A * | 3/1965 | Wolfe | ...................... | A61G 3/06 414/550 |
| 3,677,424 A * | 7/1972 | Anderson | ............ | A61G 7/1017 414/550 |
| 6,340,189 B1 * | 1/2002 | Pordy | .................... | B60N 3/023 16/110.1 |
| 2018/0194290 A1 * | 7/2018 | Lewis | ..................... | B60R 3/007 |

* cited by examiner

*Primary Examiner* — Glenn F Myers
(74) *Attorney, Agent, or Firm* — Felix L. Fischer

(57) ABSTRACT

A lift assist device employs a striker pin assembly having a striker pin adapted for removable insertion into a striker on a door of a vehicle and a pivot tube. A lift assembly has an actuator boss and a pivot pin connected to the actuator boss with the pivot pin removably received in the pivot tube. A telescoping support arm depends from the actuator boss and a seat is attached to a terminal end of the telescoping support arm.

17 Claims, 11 Drawing Sheets

DOOR MOUNTED LIFT ASSIST DEVICE

REFERENCES TO RELATED APPLICATIONS

This application claims priority of U.S. provisional application Ser. No. 62/761,642 filed on Apr. 2, 2018 entitled B-Car-Free, the disclosure of which is incorporated herein by reference.

BACKGROUND

Field

This invention relates generally to the field of lifting devices to assist the disabled or elderly and more particularly to a lift assist device employing a removable attachment assembly received on a vehicle door striker and a swiveling actuator and seat assembly removably engaged to the attachment assembly.

Description of the Related Art

Assisting the elderly or disabled into a vehicle for transportation is typically accomplished either by direct lifting of the individual by an assistant or aide or through lift or ramp devices that are custom designed and permanently attached to the vehicle. Directly lifting the individual may result in injury to the assistant or to the individual. Custom designed lift or ramp assemblies require extensive modification of a vehicle and are expensive. Further, only the modified vehicle may be used for transportation of the individual.

It is therefore desirable to provide a device which is easily removably attachable to a vehicle to provide lifting capability to allow transfer of an individual into the vehicle.

SUMMARY

The embodiments disclosed herein overcome the shortcomings of the prior art by providing a lift assist device employing a striker pin assembly having a striker pin adapted for removable insertion into a striker on a door of a vehicle and a pivot tube. A lift assembly has an actuator boss and a pivot pin connected to the actuator boss with the pivot pin removably received in the pivot tube. A telescoping support arm depends from the actuator boss and a seat is attached to a terminal end of the telescoping support arm.

BRIEF DESCRIPTION OF THE DRAWINGS

These and other features and advantages of the present invention will be better understood by reference to the following detailed description of exemplary embodiments when considered in connection with the accompanying drawings wherein.

DETAILED DESCRIPTION

Figure 1:
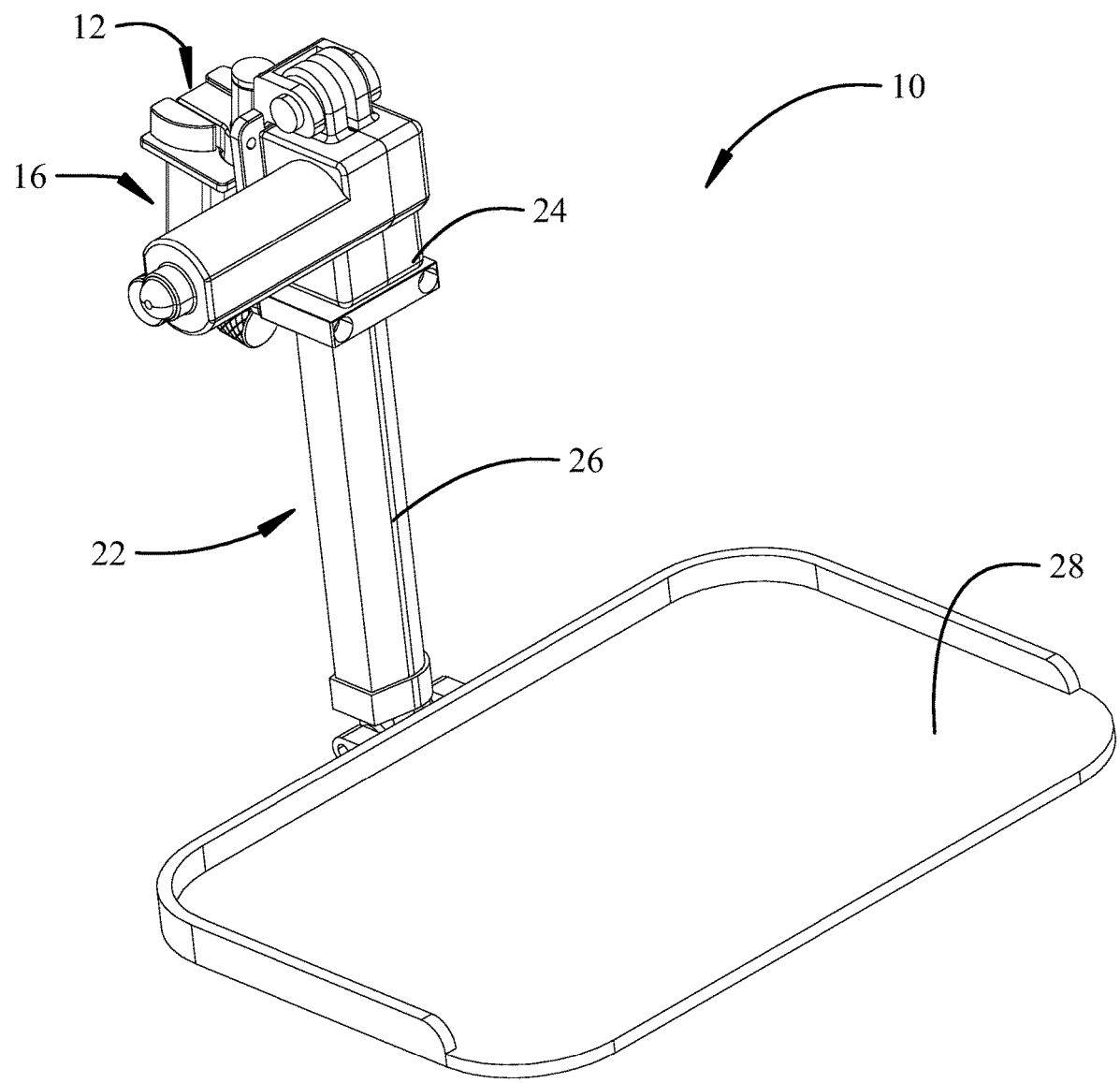
FIG. 1 is a front right pictorial depiction of an implementation of the door mounted lift assist device.
Figure 2:
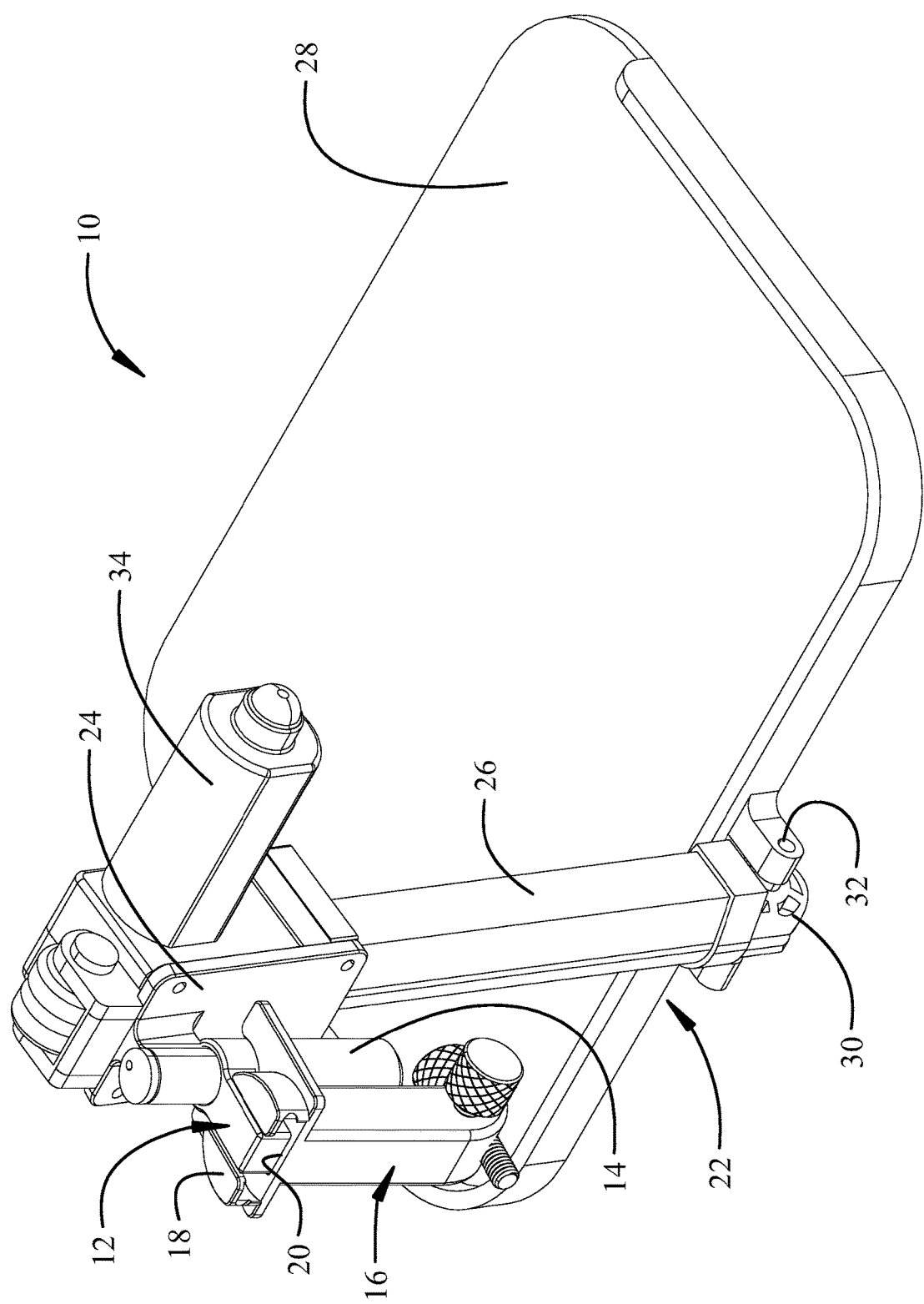
FIG. 2 is a rear right pictorial depiction of the implementation of FIG. 1.

Embodiments shown in the drawings and described herein provide a door mounted lift assist device removably attachable to the striker of a vehicle door frame. A door attachment mechanism having a striker pin received in the striker and secured with a striker housing assembly supports a pivot tube rotationally engaging a lift assembly including an actuator and a seat. Referring to the drawings, FIGS. 1 and 2 show a lift assist device 10 employing a striker pin assembly 12 having a pivot tube 14. A striker housing 16 has a receiver 18 for the striker and an alignment channel 20 in a positioning leg 21 receiving a striker pin (to be described subsequently) on the striker pin assembly 12. A lift assembly 22 has an actuator boss 24 with a pivot pin (to be described in greater detail subsequently) received in the pivot tube 14. A telescoping seat support arm 26 extends from the actuator boss 24 and a seat 28 is attached to a lower termination 30 of the support arm. For the example shown in the drawings, the seat 28 is attached to the lower termination 30 with an axle 32 allowing the seat to be rotate upward to fold for compact storage. An actuator 34 is operatively engaged to the support arm 26 to telescopically extend and retract the support arm.

Figure 3:
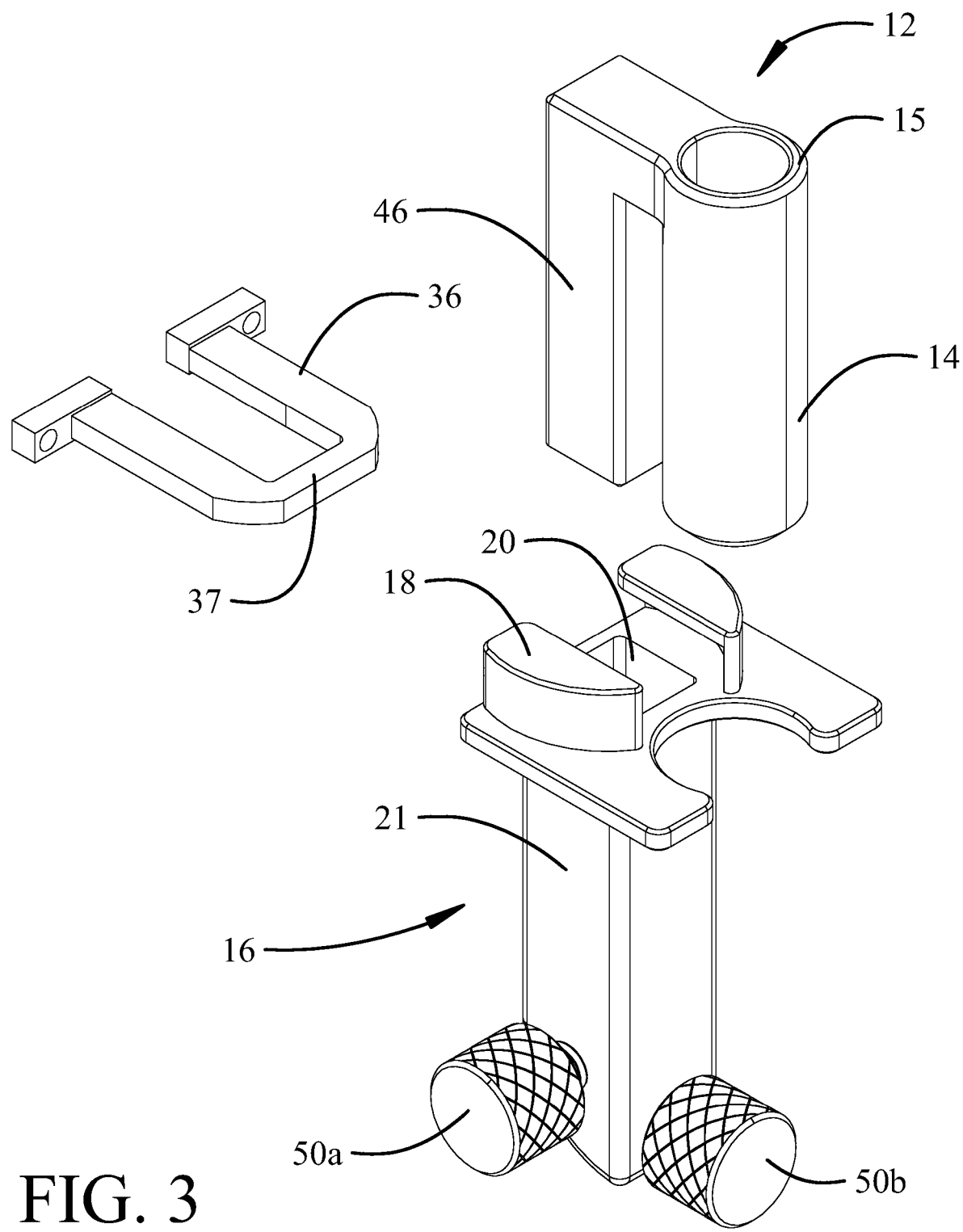
FIG. 3 is an exploded pictorial view of the striker, striker pin assembly and striker housing.
Figure 4:
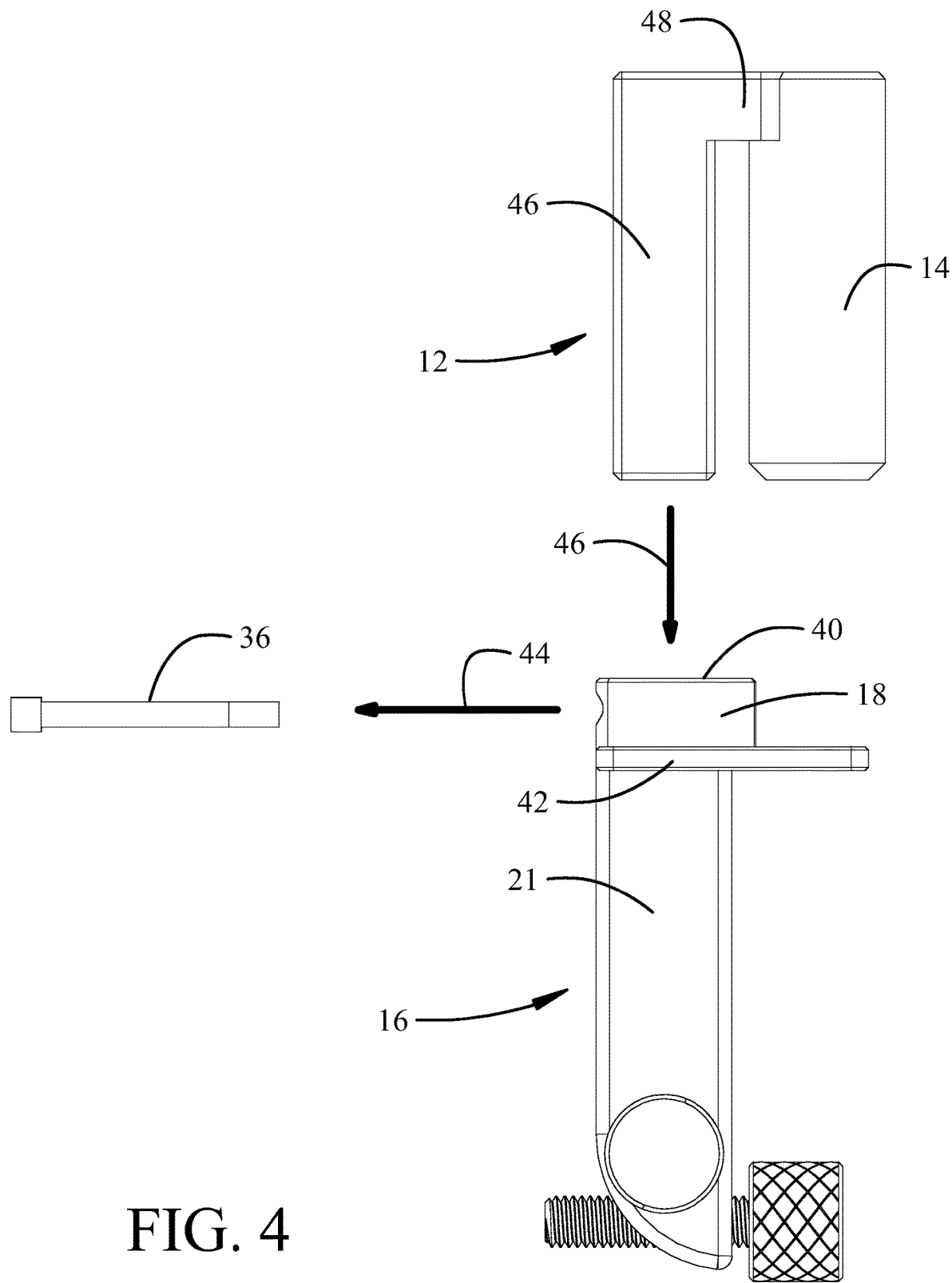
FIG. 4 is an exploded side view of the striker, striker pin assembly and striker housing showing assembly directions.
Figures 5A, 5B:
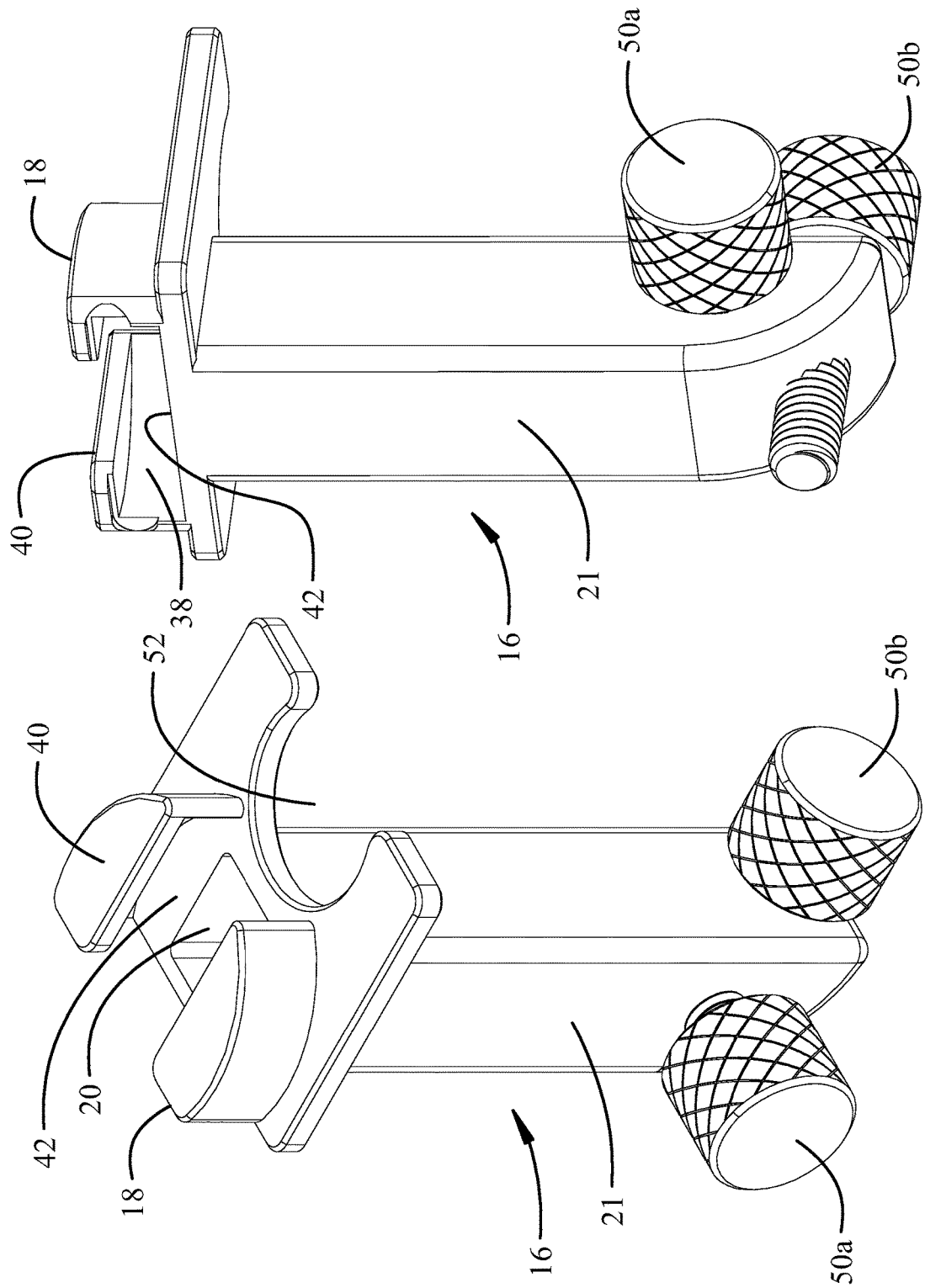
FIGS. 5A and 5B are front right and rear right pictorial views of the striker housing.
Figure 6B:
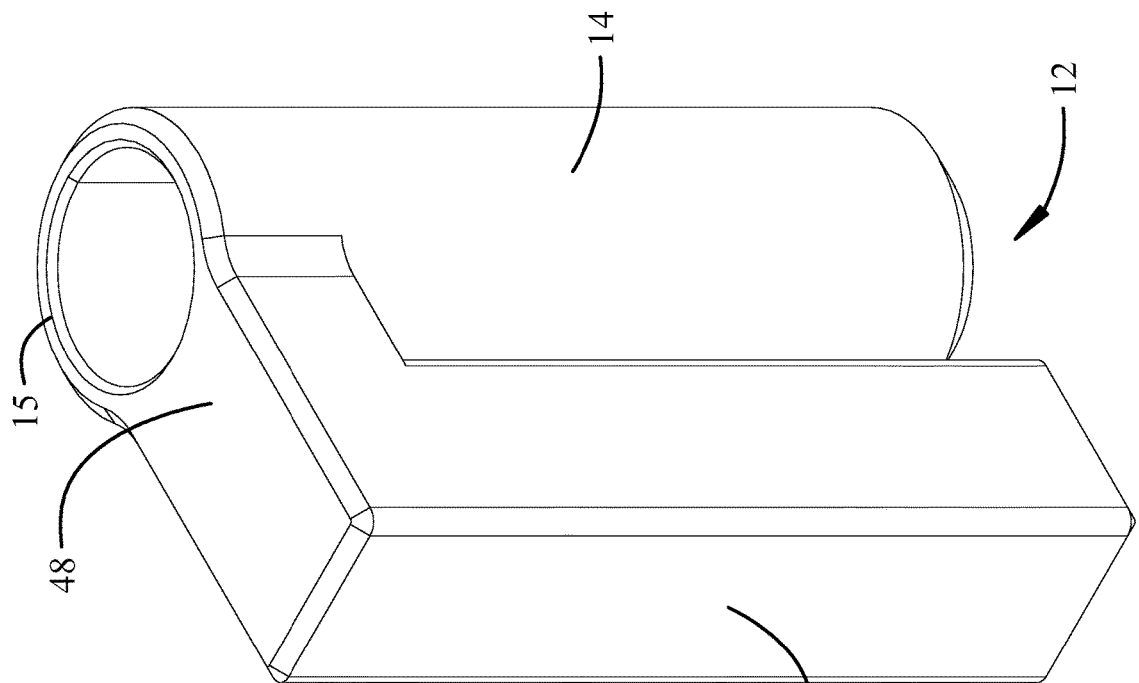
FIGS. 6A and 6B are are front right and rear right pictorial views of the striker pin assembly.
Figure 6A:
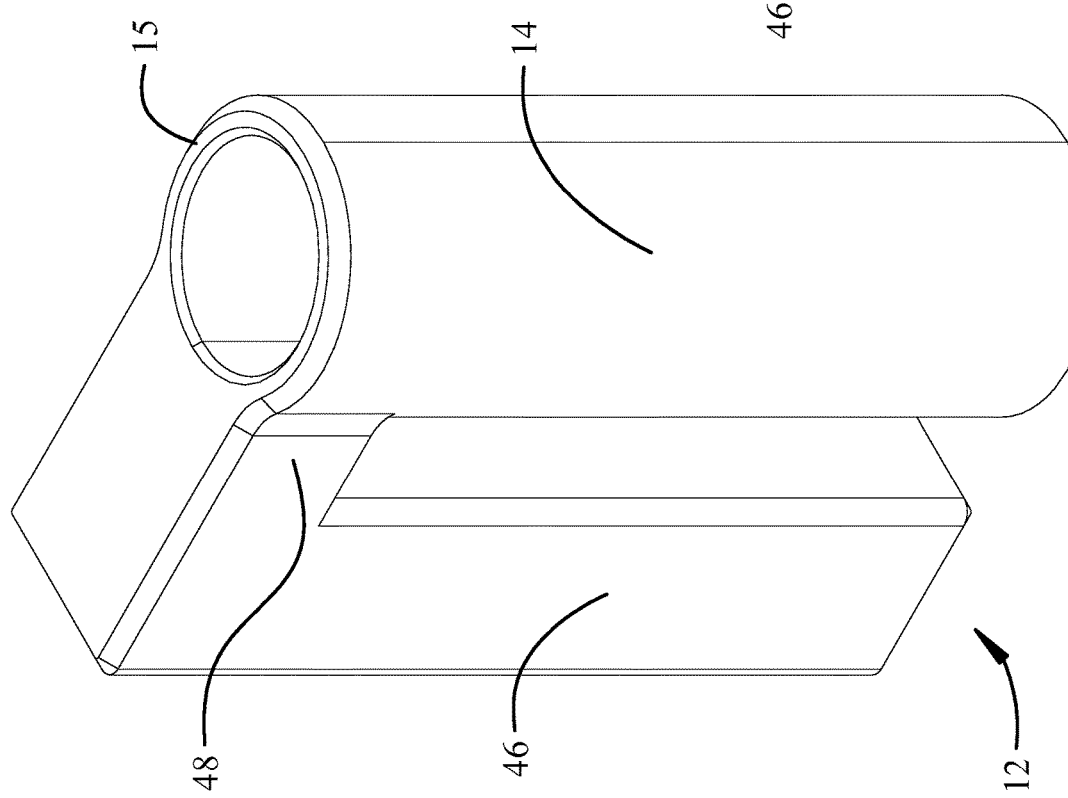

Detailed structure and operation of the striker pin assembly 12 and striker housing 16 are shown in FIGS. 3 and 4. The lift assist device 10 is operable with a striker 36 which extends from a vehicle door frame (not shown). In most vehicles, for example, the front door frame extends into the B pillar of the body frame as the rear profile of the door frame and the striker 36 is attached to the door frame below the B pillar. The striker housing 16 (shown in detail in FIGS. 5A and 5B) includes the receiver 18 which has insert slots 38 with a top flange 40 and a bottom flange 42 allowing the striker housing 16 to be inserted over the striker 36 as indicated by arrow 44 in FIG. 4. A striker pin 46 of the striker assembly 12 is then inserted as indicated by arrow 45, through the top flange 40 (which may be bifurcated as shown in the example or employ an aperture to receive the striker pin 46), through the striker 36 and into the alignment channel 20 in positioning leg 21 of the striker housing 16. In the example the positioning leg 21 depends from the bottom flange 42 of the receiver 38. A support neck 48 (as seen in detail in FIGS. 6A and 6B) extends between the striker pin 46 and the pivot tube 14. The support neck 48 forms a saddle with the striker pin 46 and pivot tube 14 extending over an end 37 of the striker 36 to react the weight of the lift assist device 10, and a user seated on the seat 28, on the striker 36 which distributes that force into the door frame structure of the vehicle. The top flange 40 may react a portion the weight of the lift assist device 10 on the striker 36. The receiver 38 and striker pin 46 in the assembled configuration prevent disengagement of the striker pin assembly 12 and striker housing 16 from the striker 36.

The positioning leg 21 of the striker housing 16 incorporates alignment clamps 50*a* and 50*b*, which for the example are bolts threaded through orthogonal bores in the positioning leg 21 with knurled heads for manual adjustment, extending from the positioning leg 21 to engage the rear and lateral surfaces of the door frame to make the striker housing 16 (and assembled striker pin assembly 12) plumb with respect to the door frame. In alternative implementations articulating push-pull clamps may be employed. Additionally, lower flange 42 extends forward from the positioning leg 21 and incorporates an semicircular aperture 52 which receives the pivot tube 14 of the striker pin assembly 12 when engaged on the striker housing 14. The extended lower flange 42 and aperture 52 receiving the pivot tube 14 aids in providing rigidity of the fixed alignment of the striker pin assembly 12 with respect to the door frame. The example additionally employs a square cross section for the striker pin 46 and alignment channel 20 to fix the relative alignment of the striker pin assembly 12 and striker housing 14. In alternative implementations other geometric cross sections may be employed with a preferred cross section having flat sides approximately parallel to sides and an end of the striker to resist rotation of the pin in the striker.

Figure 7:
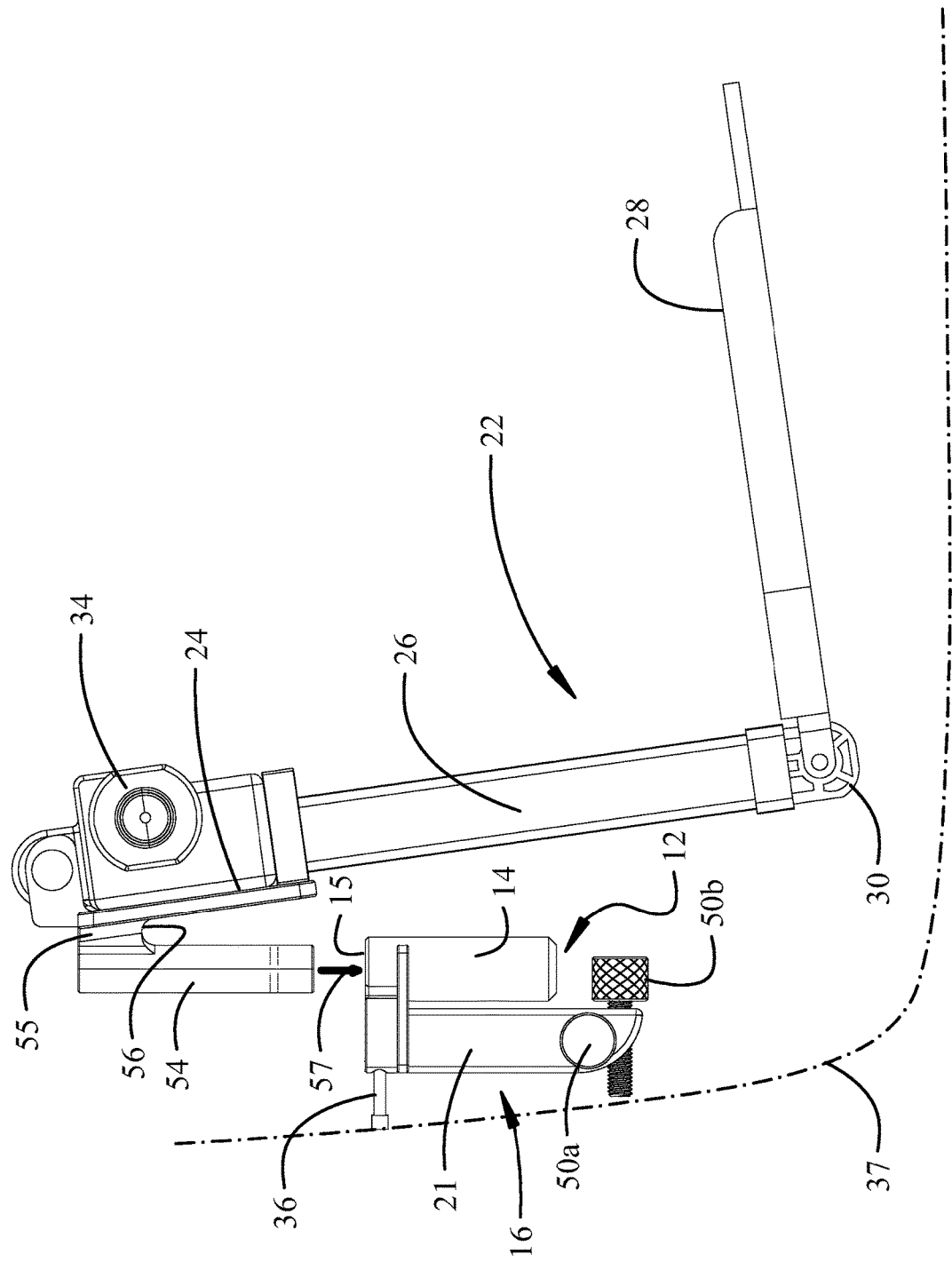
FIG. 7 is a side view of the striker housing and striker pin assembly mounted on the striker and the lift assembly positioned for insertion of the pivot pin into the pivot tube.
Figure 9A:
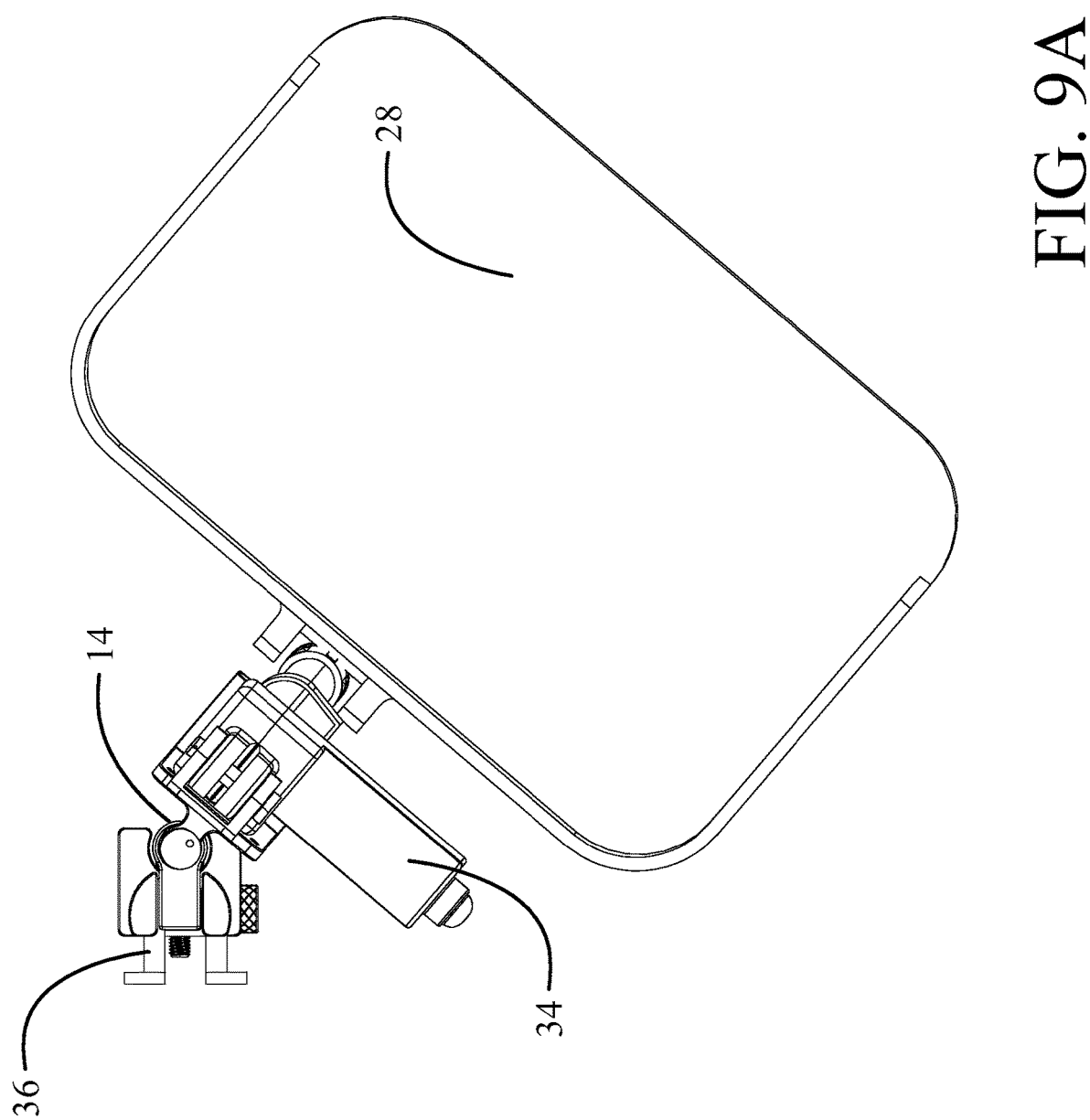
FIGS. 9A and 9B show the lift assembly rotated outward and aligned.

With the striker pin assembly 12 and striker housing 14 assembled on the striker 36 as seen in FIG. 7 (with door frame 37 shown in phantom), the lift assembly 22 is attached by inserting a pivot pin 54 into the pivot tube 14 as indicated by arrow 57. Pivot pin 56 extends from the actuator boss 24 with a tang 55 having a relief 56 to engage a top rim 15 of the pivot tube 14 to facilitate rotation of the lift assembly 22. Support arm 26 and the attached seat 28 depend from the actuator boss 24. Pivot pin 54 is rotatable in pivot tube 14 allowing the lift assembly to be rotated outward (as shown in FIG. 9A) to provide clearance for the seat 28 for loading the user and lifting past the door sill to position the seat 28 next to the car seat.

Figure 8:
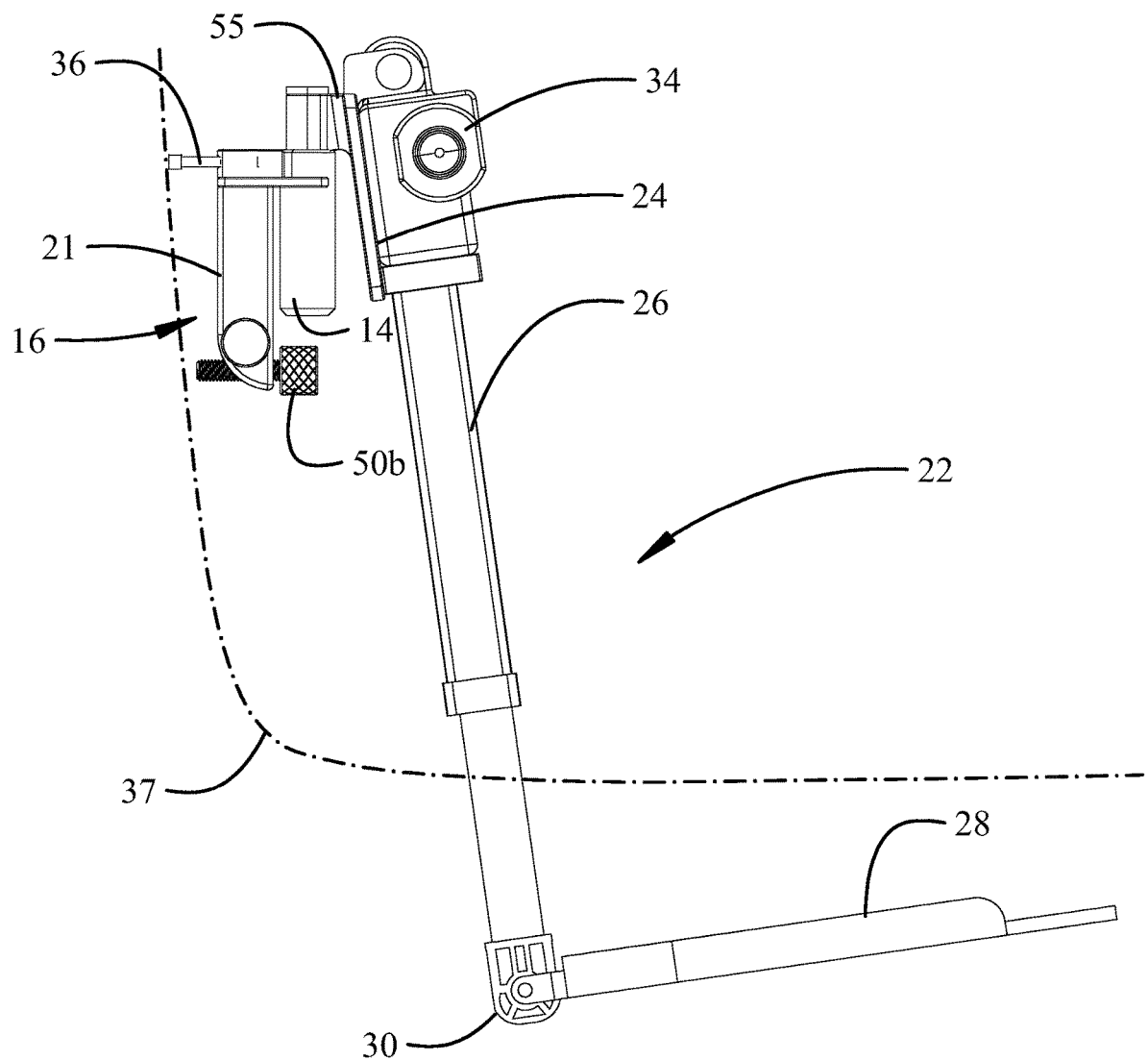
FIG. 8 is a side view of the fully assembled lift assist device with the support arm telescopically extended.
Figure 9B:
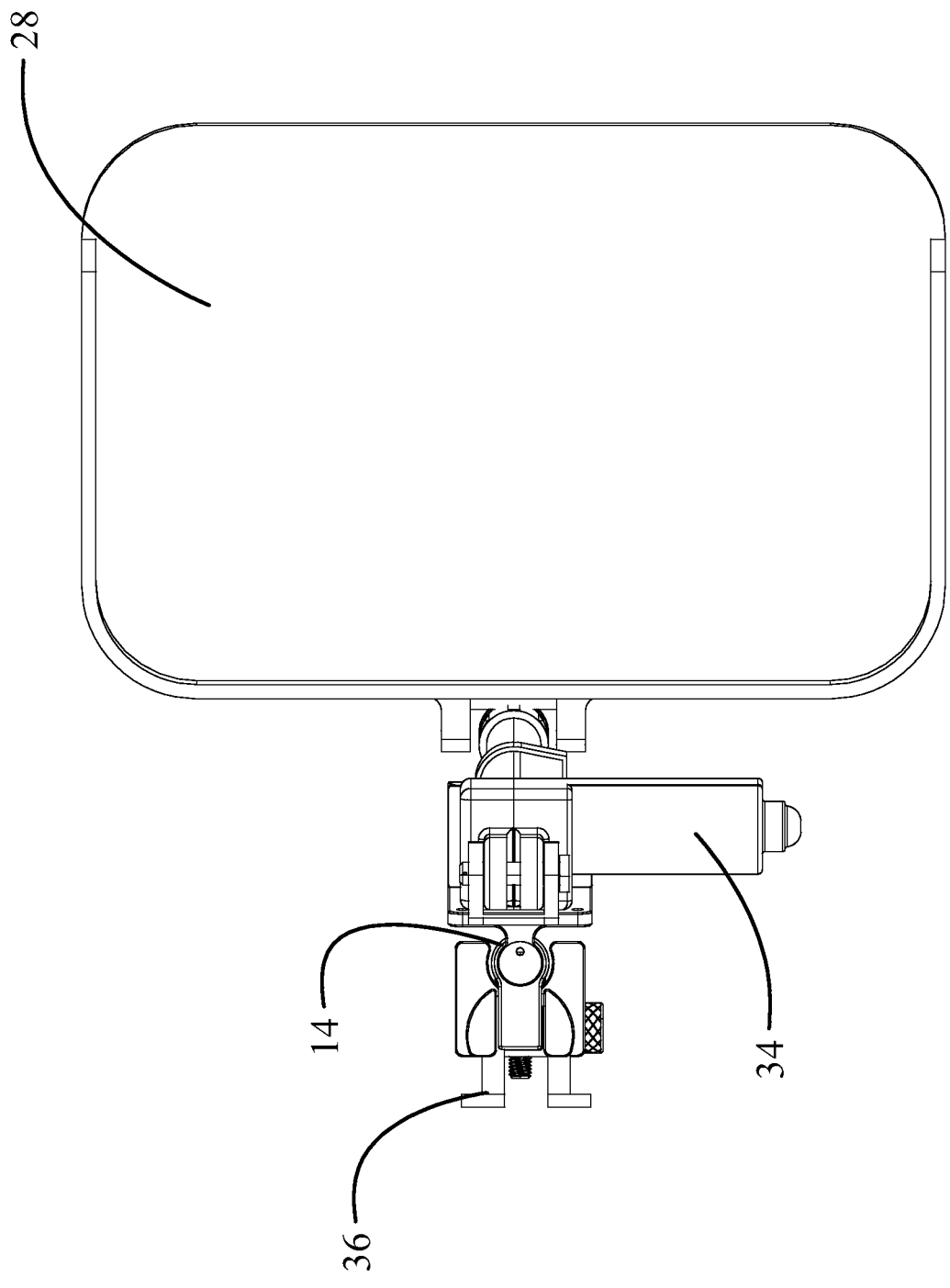

As shown in FIG. 8, the telescoping support arm is extended to lower the seat 28. The actuator 34, which may be a cable drive linear actuator or similar device, is employed to extend and retract the telescoping support arm. After the user is seated, the actuator retracts the support arm 24 raising the seat to be level with the car seat. The lift assembly 22 may then be rotated inward on pivot pin 54 (as seen in FIG. 9B to align the seat 28 and car seat for easy transfer of the user into the car seat.

When loading of the user is complete, the lift assembly 22 is removed by extracting the pivot pin 54 from the pivot tube 14. The striker pin assembly 12 is then removed from the striker 36 and striker housing 16 and the striker housing is then removed from the striker allowing normal operation of the door latch in the striker. The striker pin assembly 22, striker housing 16 and lift assembly 22 may be easily stored in the vehicle. For unloading the user, the striker housing 16, striker pin assembly 12 and lift assembly 22 are reassembled on the striker 36 and are operable to unload the user.

Figure 10:
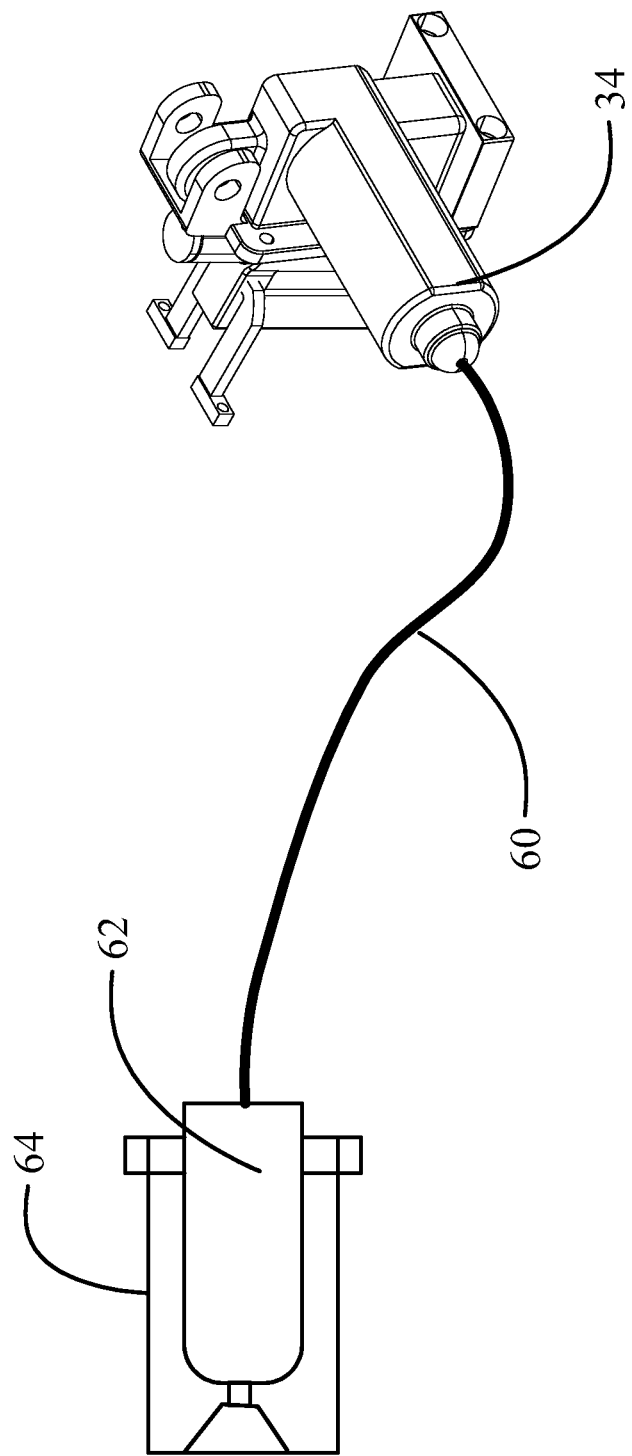
FIG. 10 is a schematic diagram of power connection for actuator operation in the lift assist device.

As seen in FIG. 10, the actuator 34 is powered, in the example shown, by a power cord 60 and DC adapter 62 which may be plugged into a power port 64 in the vehicle.

The striker pin assembly 12 and striker housing 14 may be provided in multiple sets for engaging different configurations of the striker 36 in various vehicles. Additionally, in certain implementations, the striker pin assembly 12 may be configured with shaping of the striker pin 46, support neck 48 and pivot tube 14 for close engagement of the striker 36 and combination with a striker housing may not be required.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A lift assist device comprising:
   a striker pin assembly having a striker pin adapted for removable insertion into a striker on a door of a vehicle and a pivot tube;
   a lift assembly having
     an actuator boss;
     a pivot pin connected to the actuator boss, said pivot pin removably received in the pivot tube;
     a telescoping support arm depending from the actuator boss; and
     a seat attached to a terminal end of the telescoping support arm.

2. The lift assist device as defined in claim 1 further comprising a striker housing having a receiver with insert slots, a top flange and a bottom flange, said receiver removably inserted over the striker, the top flange adapted for insertion of the striker pin through the top flange and striker into an alignment channel in positioning leg.

3. The lift assist device as defined in claim 2 wherein the positioning leg depends from the bottom flange of the receiver.

4. The lift assist device as defined in claim 3 further comprising alignment clamps extending form the positioning leg.

5. The lift assist device as defined in claim 1 wherein the striker pin has a geometric cross section having flat sides parallel to sides and an end of the striker to resist rotation of the pin in the striker.

6. The lift assist device as defined in claim 1 wherein the striker pin assembly has a support neck between the striker pin and pivot tube, said support neck forming a saddle with the striker pin and pivot tube to react to the weight of the lift assembly on the striker.

7. The lift assist device as defined in claim 1 wherein the pivot pin is engaged to the actuator boss with a tang having a relief to engage a top rim of the pivot tube to facilitate rotation of the lift assembly.

8. The lift assist device as defined in claim 1 further comprising an actuator attached to the actuator boss in operative engagement with the telescoping support arm to extend and retract the support arm.

9. The lift assist device as defined in claim 1 wherein the seat is attached to the terminal end with an axle whereby the seat folds for compact storage.

10. A door attachment mechanism for a lift assembly, said mechanism comprising:
    a striker pin assembly having a striker pin adapted for removable insertion into a striker on a door of a vehicle and a pivot tube; and,
    a striker housing having a receiver with insert slots, a top flange and a bottom flange, said receiver removably inserted over the striker, the top flange adapted for insertion of the striker pin through the top flange and striker into an alignment channel in a positioning leg of the striker housing.

11. The door attachment mechanism as defined in claim 10 wherein the positioning leg depends from the bottom flange of the receiver.

12. The door attachment mechanism as defined in claim 11 further comprising alignment clamps extending form the positioning leg.

13. The door attachment mechanism as defined in claim 10 wherein the striker pin has a geometric cross section having flat sides parallel to sides and an end of the striker to resist rotation of the pin in the striker.

14. The door attachment mechanism as defined in claim 10 wherein the receiver is bifurcated allowing insertion of the striker pin.

15. The door attachment mechanism as defined in claim 10 wherein the striker pin assembly has a support neck between the striker pin and pivot tube, said support neck forming a saddle with the striker pin and pivot tube received over an end of the striker.

16. The door attachment mechanism as defined in claim 15 wherein the lower flange extends forward from the positioning leg and incorporates an semicircular aperture to receive the pivot tube of the striker pin assembly when engaged on the striker housing.

17. The door attachment mechanism as defined in claim 12 wherein the alignment clamps comprise bolts threaded through orthogonal bores in the positioning leg with knurled heads for manual adjustment, said bolts extending from the positioning leg to make the striker housing and assembled striker pin assembly plumb.

\* \* \* \* \*